United States Patent
Suzuki

(10) Patent No.: US 10,438,368 B2
(45) Date of Patent: Oct. 8, 2019

(54) APPARATUS, METHOD, AND SYSTEM FOR CALCULATING DIAMETERS OF THREE-DIMENSIONAL MEDICAL IMAGING SUBJECT

(71) Applicant: ZIOSOFT, INC., Minato-ku, Tokyo (JP)

(72) Inventor: Takahiro Suzuki, Tokyo (JP)

(73) Assignee: ZIOSOFT, INC., Tokyo (JP)

( * ) Notice: Subject to any disclaimer, the term of this patent is extended or adjusted under 35 U.S.C. 154(b) by 0 days.

(21) Appl. No.: 15/471,093

(22) Filed: Mar. 28, 2017

(65) Prior Publication Data

US 2017/0287159 A1    Oct. 5, 2017

(30) Foreign Application Priority Data

Mar. 29, 2016  (JP) ................. 2016-066841

(51) Int. Cl.
*G06K 9/00* (2006.01)
*G06T 7/62* (2017.01)
*G06T 7/11* (2017.01)
*G06T 15/08* (2011.01)

(52) U.S. Cl.
CPC .............. *G06T 7/62* (2017.01); *G06T 7/11* (2017.01); *G06T 15/08* (2013.01); *G06T 2207/10081* (2013.01); *G06T 2207/20104* (2013.01); *G06T 2207/30008* (2013.01); *G06T 2207/30048* (2013.01); *G06T 2207/30084* (2013.01); *G06T 2207/30101* (2013.01); *G06T 2210/41* (2013.01)

(58) Field of Classification Search
None
See application file for complete search history.

(56) References Cited

U.S. PATENT DOCUMENTS

| | | | |
|---|---|---|---|
| 2005/0113664 A1* | 5/2005 | Stefani | A61B 6/032 600/407 |
| 2009/0070089 A1* | 3/2009 | Kawato | G01N 33/5026 703/11 |
| 2010/0036242 A1* | 2/2010 | Yuk | A61B 5/02014 600/437 |
| 2011/0137727 A1* | 6/2011 | Chung | G06F 3/0346 705/14.55 |
| 2011/0262018 A1* | 10/2011 | Kumar | G06T 7/0012 382/131 |

(Continued)

FOREIGN PATENT DOCUMENTS

JP    2011-024826 A    2/2011

OTHER PUBLICATIONS

Merkus, Henk G. "Chapter 2: Particle Size, Size Distributions and Shape." Particle size measurements: fundamentals, practice, quality. vol. 17. Springer Science & Business Media, 2009. pp. 12-16. (Year: 2009).*

(Continued)

*Primary Examiner* — Samah A Beg
(74) *Attorney, Agent, or Firm* — Pearne & Gordon LLP

(57) ABSTRACT

A medical image processing apparatus includes a port, a processor and a display. The port acquires volume data including a subject. The processor calculates long and short diameters of the subject. The display shows the long and short diameters. A line segment presenting the long diameter and a line segment presenting the short diameter is a pair of skew lines.

19 Claims, 12 Drawing Sheets

(56) References Cited

U.S. PATENT DOCUMENTS

| | | | | |
|---|---|---|---|---|
| 2013/0039554 | A1* | 2/2013 | Awechter-Stehle | ........................ G06T 7/0012 382/128 |
| 2013/0259337 | A1* | 10/2013 | Guhring | .................. G06T 7/602 382/131 |
| 2014/0031691 | A1* | 1/2014 | Nagase | .................. A61B 8/466 600/443 |
| 2014/0100461 | A1* | 4/2014 | Abe | .................... A61B 8/5292 600/443 |
| 2014/0358001 | A1* | 12/2014 | Kim | ........................ A61B 8/14 600/443 |
| 2015/0038846 | A1* | 2/2015 | Abe | ........................ A61B 8/06 600/443 |
| 2015/0253407 | A1* | 9/2015 | Nitta | .................... A61B 5/7425 382/131 |
| 2016/0019688 | A1* | 1/2016 | Li | .......................... G06T 17/00 348/46 |
| 2016/0048965 | A1* | 2/2016 | Stehle | .................. G06T 7/0016 382/131 |
| 2016/0063695 | A1* | 3/2016 | Lee | ........................ G06T 15/08 382/131 |
| 2016/0225145 | A1* | 8/2016 | Nagata | .................. G06T 7/0012 |
| 2016/0275681 | A1* | 9/2016 | D'Alessandro | ....... G06T 3/4038 |
| 2016/0292848 | A1* | 10/2016 | Plakas | ................... A61B 8/085 |
| 2017/0039737 | A1* | 2/2017 | Madabhushi | ........ A61B 5/7267 |
| 2017/0164924 | A1* | 6/2017 | Urabe | .................. A61B 5/1075 |
| 2017/0187935 | A1* | 6/2017 | Miyake | .................. H04N 5/232 |
| 2017/0273557 | A1* | 9/2017 | Nakazawa | ........... A61B 3/0025 |

OTHER PUBLICATIONS

Wirth, Michael. "Shape Analysis and Measurement." 2004, Microsoft PowerPoint Lecture file. Accessed Online (Jul. 24, 2019). <http://www.cyto.purdue.edu/cdroms/micro2/content/education/wirth10.pdf>. (Year: 2004).*

Lengyel, E., "Mathematics for 3D Game Programming and Computer Graphics", Course Technology, 2012, pp. 211-217.

* cited by examiner

APPARATUS, METHOD, AND SYSTEM FOR CALCULATING DIAMETERS OF THREE-DIMENSIONAL MEDICAL IMAGING SUBJECT

CROSS-REFERENCE TO RELATED APPLICATION

This application claims priority based on Japanese Patent Application No. 2016-066841, filed on Mar. 29, 2016, the entire contents of which are incorporated by reference herein.

BACKGROUND OF THE INVENTION

1. Field of the Invention

The present disclosure relates to a medium image processing apparatus, a medium image processing method, and a medical image processing system

2. Related Art

In the related art, the sizes or states of tissues are diagnosed using long diameters or long diameters and short diameters of tissues or diseases (hereinafter referred to as tissues or the like) in some cases in medical image processing fields. Whether predetermined medical instruments can pass inside tubular tissues is determined in some cases using short diameters of tissues or the like.

As an apparatus that calculates a long diameter or a short diameter of a tissue or the like, there is known a medical image processing apparatus in which the longest diameter of the contour of a predetermined cross-section of a three-dimensional image is set as a long diameter and the longest diameter of a line segment closed vertically to the long diameter is set as a short diameter (see JP-A-2011-24826 (paragraph 0075 and FIG. 11). There is known a medical image processing apparatus that calculates long and short diameters of a tissue or the like by performing elliptic approximation on a tissue or the like.

SUMMARY OF THE INVENTION

In JP-A-2011-24826, a long diameter and a short diameter in a cross-section are orthogonal to each other, but the lengths of the long diameter and the short diameter are changed in accordance with a method of deciding a cross-section of a three-dimensional image. Therefore, objectivity of the calculated long and short diameters is insufficient. An actual tissue or the like may be distorted three-dimensionally, and thus has a shape different from an ellipsoid in many cases. For this reason, in approximation of an ellipsoid, an error occurs in the shape of an actual tissue or the like in some cases. As a result, it is difficult for a user to intuitively recognize the shape of a tissue or the like in some cases. An ellipsoid generally has three diameters with different lengths. Thus, even when the longest diameter is set to a long diameter, it is not decided which diameter is set as a short diameter between the other two diameters.

The present disclosure is finalized in view of the foregoing circumstances and provides a medical image processing apparatus, a medical image processing method, and a medical image processing program capable of enabling a user to easily recognize an actual shape of a tissue or the like.

A medical image processing apparatus includes a port, a processor and a display. The port acquires volume data including a subject. The processor calculates long and short diameters of the subject. The display shows the long and short diameters. A line segment presenting the long diameter and a line segment presenting the short diameter is a pair of skew lines.

A medical image processing method in a medical image processing apparatus, includes: acquiring volume data including a subject; calculating long and short diameters of the subject; and displaying the long and short diameters on a display. A line segment presenting the long diameter and a line segment presenting the short diameter is a pair of skew lines.

A medical image processing system causes a medical image processing apparatus to execute operations including: acquiring volume data including a subject; calculating long and short diameters of the subject; and displaying the long and short diameters on a display. A line segment presenting the long diameter and a line segment presenting the short diameter is a pair of skew lines.

According to the present disclosure, a user easily recognizes an actual shape of a tissue or the like.

BRIEF DESCRIPTION OF THE DRAWINGS

FIG. 2 is a flowchart illustrating an entire process procedure of an operation of calculating long and short diameters of a tissue or the like;

DETAILED DESCRIPTION OF THE INVENTION

Hereinafter, embodiments of the present disclosure will be described with reference to the drawings.

In the present invention, a medical image processing apparatus includes at least one port, at least one processor and at least one display. The port acquires volume data including a subject. The processor calculates long and short diameters of the subject. The display shows the long and short diameters. The processor calculates the long and short diameters, in accordance with the volume data acquired by the port, to display such that a line segment presenting the long diameter and a line segment presenting the short diameter is a pair of skew lines.

First Embodiment

A medical image processing apparatus according to the embodiment calculates long and short diameters in a three-dimensional image (3D image) obtained by imaging a subject such as a tissue or the like. The tissue or the like includes an organ such as a bone or a blood vessel, a part of an organ such as a lobe of a lung or a ventricle, or a disease tissue such a tumor or a cyst. The tissue or the like includes a combination of a plurality of organs such as right and left lungs. The long and short diameters are one of the parameters used to recognize the shape or size of the tissue or the like.

The long diameter is a representative line segment which presents the size of a tissue or the like. The long diameter is mostly a line segment which connects two end points of a three-dimensional region including a tissue or the like and has the longest distance. The short diameter is a line segment which is shorter than the long diameter and suggests the flat degree of a tissue or the like in combination of the long diameter or the volume of a tissue. The short diameter is mostly a line segment which is shorter than the long diameter and connects two end points of a three-dimensional region including a tissue or the like.

Figure 1:
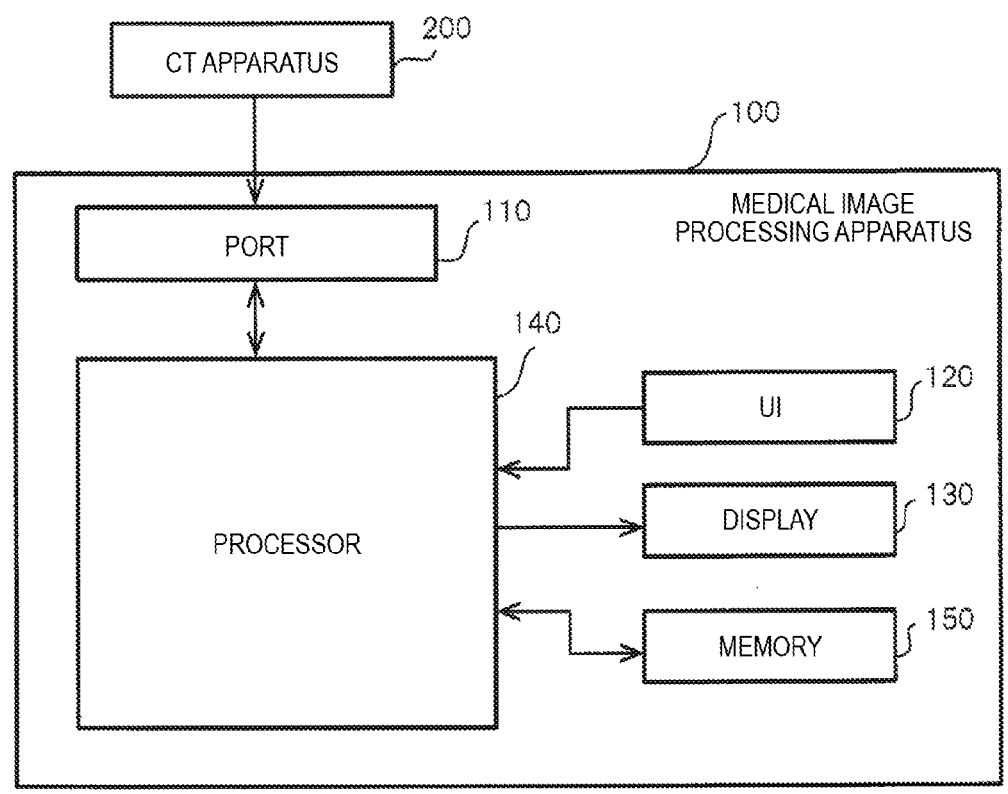
FIG. 1 is a block diagram illustrating a configuration example of a medical image processing apparatus according to a first embodiment.

FIG. 1 is a block diagram illustrating a configuration example of a medical image processing apparatus 100 according to a first embodiment. The medical image processing apparatus 100 includes a port 110, a user interface (UI) 120, a display 130, a processor 140, and a memory 150.

A CT apparatus 200 is connected to the medical image processing apparatus 100. The medical image processing apparatus 100 acquires volume data from the CT apparatus 200 and performs a process on the acquired volume data. The medical image processing apparatus 100 is configured to include a personal computer (PC) and software mounted on the PC. The medical image processing apparatus 100 may be provided an attachment apparatus of the CT apparatus 200.

The CT apparatus 200 irradiates an organism with an X-ray and acquires an image (CT image) using a difference in absorption of the X-ray by a tissue in a body. A human body can be exemplified as the organism. The organism is an example of a subject.

The plurality of CT images may be acquired in a time series. The CT apparatus 200 generates volume data including information regarding any spot inside the organism. Any spot inside the organism may include various organs (for example, a heart and a kidney). By acquiring the CT image, it is possible to obtain a CT value of each voxel of the CT image. The CT apparatus 200 transmits the volume data as the CT image to the medical image processing apparatus 100 via a wired circuit or a wireless circuit.

The CT apparatus 200 can also acquire a plurality of piece of three-dimensional volume data by continuously performing imaging and generate a moving image. Data of a moving image formed by a plurality of three-dimensional images is also referred to as 4-dimensional (4D) data.

The port 110 in the medical image processing apparatus 100 includes a communication port or an external apparatus connection port and acquires volume data obtained from the CT image. The acquired volume data may be transmitted directly to the processor 140 to be processed variously or may be stored in the memory 150 and subsequently transmitted to the processor 140 as necessary to be processed variously.

The UI 120 may include a touch panel, a pointing device, a keyboard, or a microphone. The UI 120 receives any input operation from a user of the medical image processing apparatus 100. The user may include a medical doctor, a radiologist, or another medical staff (paramedic staff).

The UI 120 receives an operation of designating a region of interest (ROI) in the volume data or setting a luminance condition. The region of interest may include a region of a disease or a tissue (for example, a blood vessel, an organ, or a bone).

The display 130 may include a liquid crystal display (LCD) and display various kinds of information. The various kinds of information include 3-dimensional images obtained from the volume data. The three-dimensional image may include a volume rendering image, a surface rendering image, and a multi-planar reconstruction (MPR) image. The display 130 displays long and short diameters of a tissue or the like to be described below to be superimposed on a three-dimensional image of the tissue or like.

The memory 150 includes a primary storage device such as various read-only memories (ROMs) or random access memories (RAMs). The memory 150 may include a secondary storage device such as a hard disk drive (HDD) or a solid state drive (SSD). The memory 150 stores various kinds of information or programs. The various kinds of information may include volume data acquired by the port 10, an image generated by the processor 140, and setting information set by the processor 140.

The processor 140 may include a central processing unit (CPU), a digital signal processor (DSP), or a graphics processing unit (GPU).

The processor 140 performs various processes or control by executing a medical image processing program stored in the memory 150. The processor 140 generally controls the units of the medical image processing apparatus 100.

The processor 140 may perform a segmentation process on the volume data. In this case, the UI 120 receives an instruction from the user and transmits information of the instruction to the processor 140. The processor 140 may perform the segmentation process to extract (segment) a region of interest from the volume data in accordance with a known method based on the information of the instruction. A region of interest may be manually set in response to a detailed instruction from the user. When an observation target tissue or the like is decided in advance, the processor 140 may perform the segmentation process from the volume data and extract the region of interest including the observation target tissue or the like without an instruction from the user.

The processor 140 generates a three-dimensional image based on the volume data acquired by the port 110. The processor 140 may generate a three-dimensional image based on a designated region from the volume data acquired by the port 110. When the three-dimensional image is a volume rending image, the three-dimensional image may include a ray sum image, a maximum intensity projection (MIP) image, or a raycast image.

Next, an operation of the medical image processing apparatus 100 will be described.

Figure 2:
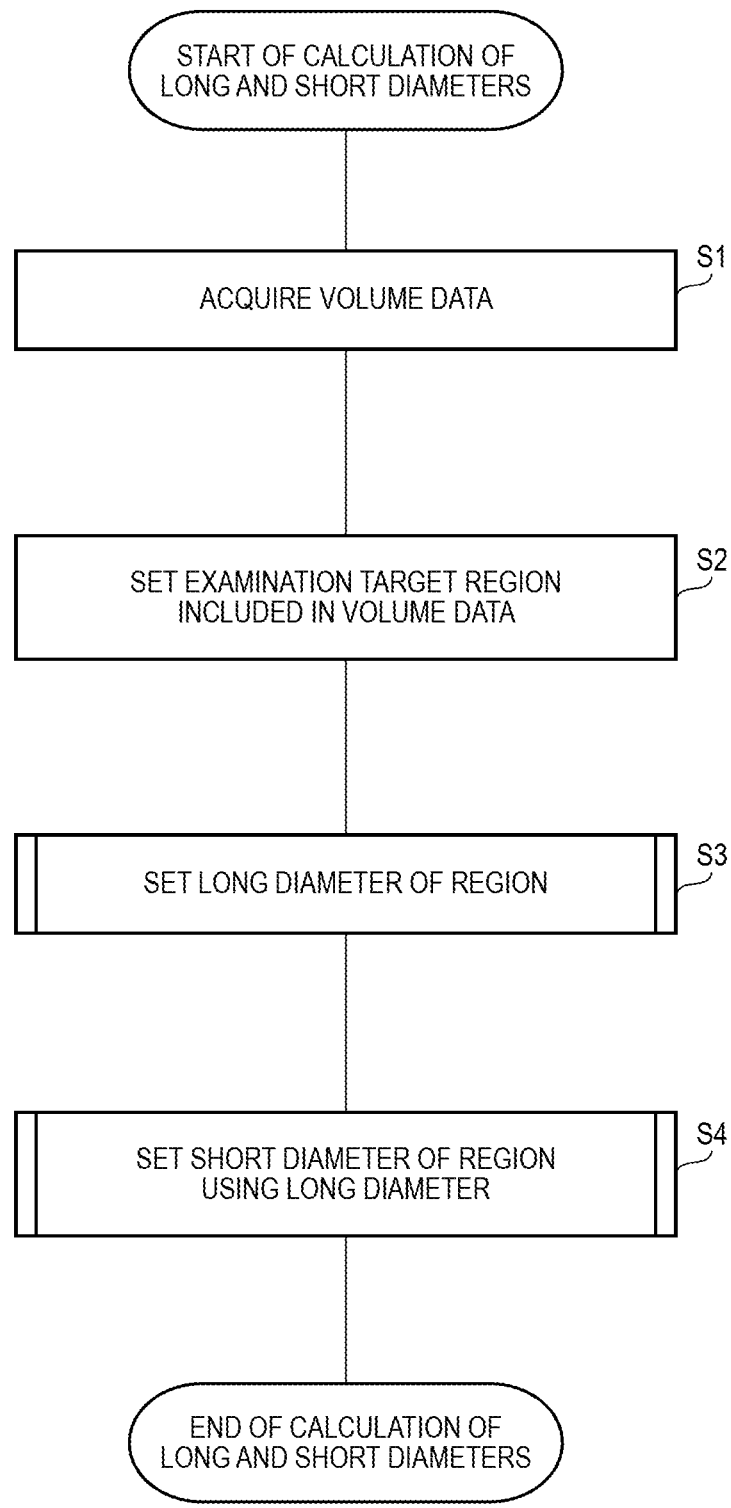

FIG. 2 is a flowchart illustrating an entire process procedure of an operation of calculating long and short diameters of a tissue or the like.

The processor 140 acquires the volume data transmitted from the CT apparatus 200 (S1).

The processor 140 sets a region of a tissue or the like included in the volume data through a known segmentation process (S2). In this case, for example, after the user may roughly designate and extract a region via the UI 120, the processor 140 may accurately extract the region.

The processor 140 sets a long diameter of the tissue or the like in the region of the set tissue or the like (S3).

The processor 140 sets a short diameter of the tissue or the like using the set long diameter (S4). Thereafter, the processor 140 ends the present operation.

The long diameter of the tissue or the like is more important than the short diameter of the tissue or the like in many cases, and thus it is easy to intuitively settle one result (the long diameter). In contrast, for the short diameter, a preferable result (the short diameter) is changed due to a kind of tissue or the like or subjectivity of the user. For this reason, when the processor 140 calculates a short diameter after calculating a long diameter, it is easy to recognize the shape or size of a tissue or the like. The processor 140 may calculate a short diameter without using a long diameter or may simultaneously acquire long and short diameters. That is, a method of calculating long and short diameters of a tissue or the like or a calculation procedure is not particularly limited.

Next, calculation methods for a long diameter will be described.

First Calculation Method for Long Diameter

Figure 3:
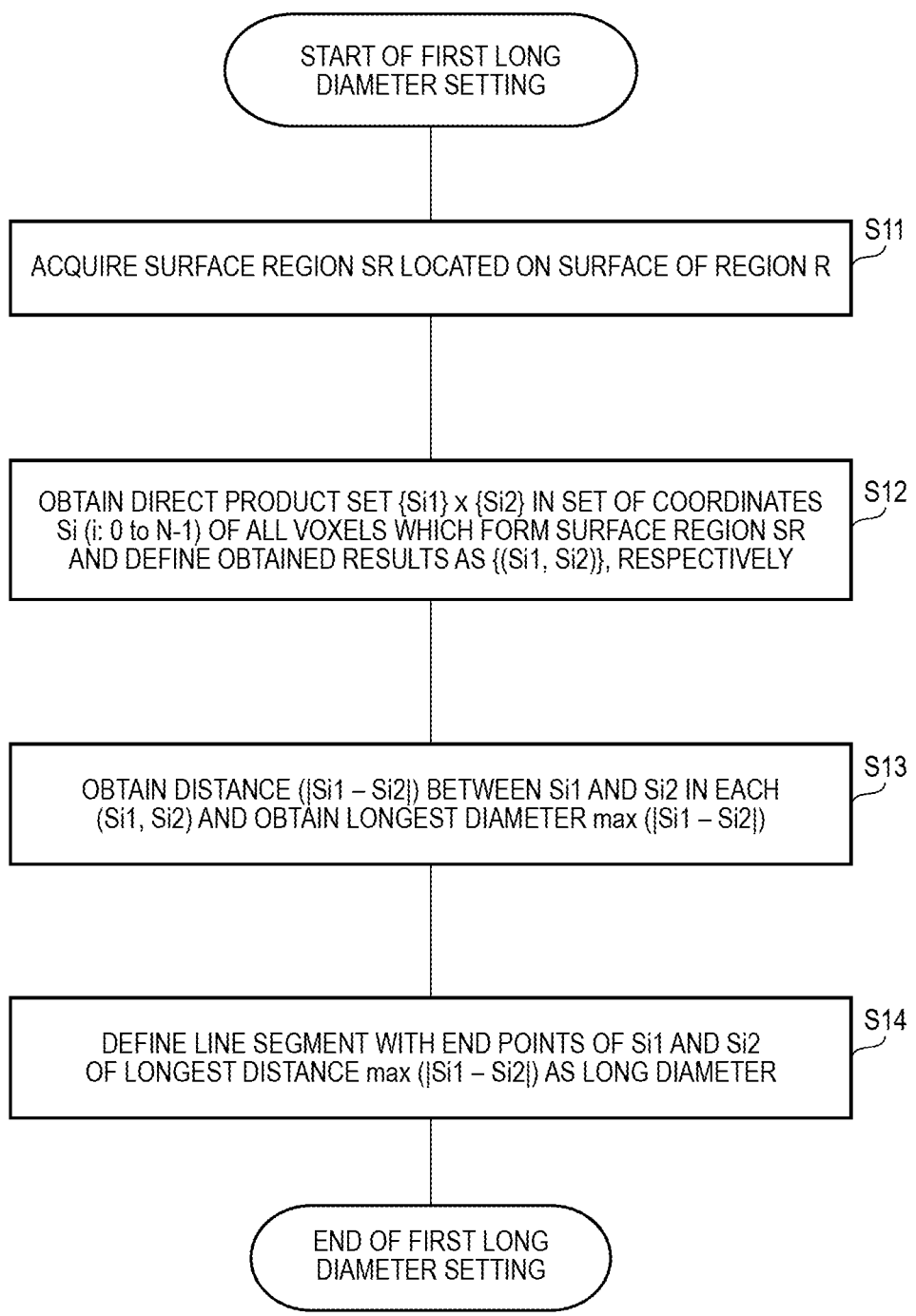
FIG. 3 is a flowchart illustrating a setting procedure for a long diameter in accordance with a first calculation method for the long diameter.

FIG. 3 is a flowchart illustrating a setting procedure for a long diameter Lk in accordance with a first calculation method for the long diameter Lk in S3 of FIG. 2.

The processor 140 acquires a surface region SR located on the surface of a region R in regard to the region R presenting a region of a tissue or the like (S11). The surface region SR is obtained by subtracting a region contracted by 1 voxel from the region R. That is, the thin surface region SR presenting the contour of the region R is extracted.

The processor 140 calculates a direct product set {Si1}×{Si2} in a set of coordinates Si (where i: 0 to N−1) of all the voxels configuring the surface region SR and configures the calculation result to (Si1, Si2) (S12).

Si1 represents first coordinates Si and Si2 represents second coordinates Si. In the direct product set (Si1, Si2), a total number of direct product sets is the same as a total number of combinations of two coordinates Si1 and Si2 in the coordinates Si of all the voxels. That is, the total number is equivalent to nC2. "i: 0 to N−1" indicates that values between "0" to "N−1" are set in order in a variable i.

The processor 140 calculates a distance (|Si1−Si2|) between the coordinates Si1 and Si2 in each (Si1, Si2) and calculates a longest distance max (|Si1−Si2|) (S13).

The processor 140 configures a line segment with end points of the coordinates Si1 and Si2 of the longest distance max (|Si1−Si2|) as a long diameter Lk (S14). Thereafter, the processor 140 ends the present process and returns the process to the main process (the process of FIG. 3).

According to the first calculation method for the long diameter Lk, pairs of points which are most away from each other among all the points included in the region R are searched for. Therefore, the long diameter Lk is intuitive. The medical image processing apparatus 100 can accurately configure the longest diameter in the tissue or the like as the long diameter Lk.

Second Calculation Method for Long Diameter

In a second calculation method for the diameter Lk, the medical image processing apparatus 100 analyzes principal components of a stereoscopic shape of a tissue or the like and calculates the long diameter Lk of the tissue of the like using a main axis V1 of the tissue or the like. This method is a commonly used technique when a cuboid bounding box with a stereoscopic shape is acquired.

Figure 4:
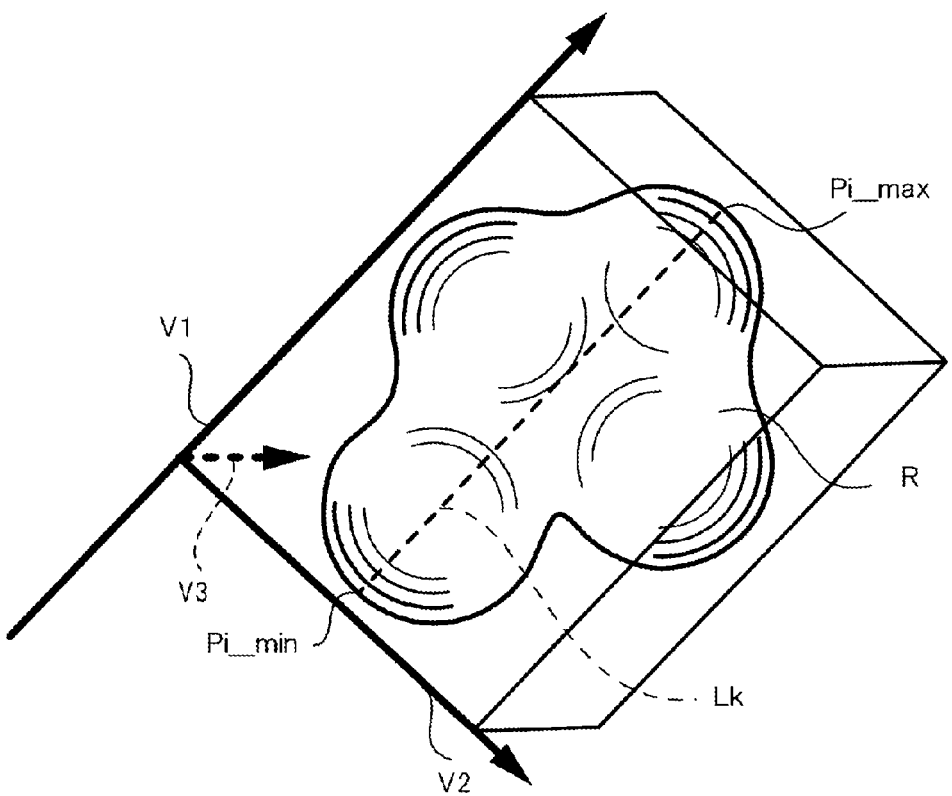
FIG. 4 is a schematic diagram illustrating a second calculation method for a long diameter.

FIG. 4 is a schematic diagram illustrating the second calculation method for the long diameter Lk. For example, according to the following technique, eigenvectors V1, V2, and V3 including the main axis V1 of the region R are calculated.

The processor 140 performs principal component analysis at the coordinates of all the voxels that form the region R.

First, the processor 140 calculates a center of gravity m of the coordinates Pi (i: 0 to N−1) of all the voxels that form the region R in accordance with (Equation 1):

$$m = 1/N * \Sigma Pi \qquad \text{(Equation 1)},$$

where the asterisk "*" means a multiplication sign. "N" represents the number of all voxels that form the region R.

The processor 140 calculates a covariance matrix C in accordance with (Equation 2):

$$C = 1/N * \Sigma (Pi-m)(Pi-m)T \qquad \text{(Equation 2)}.$$

Subsequently, the processor 140 calculates $(C-\lambda jI)Vj=0$ (I: unit matrix) and acquires eigenvalues $\lambda 1$, $\lambda 2$, and $\lambda 3$ and the eigenvectors V1, V2, and V3. Further, when $|\lambda 1|>|\lambda 2|>|\lambda 3|$ is satisfied, V1 corresponding to $\lambda 1$ serves the main axis of the region R.

The medical image processing apparatus 100 may apply an algorithm for calculating a bounding box of a set of polygons described in Reference Non-Patent Literature 1 to the volume data. This is because the longest side of a rectangular parallelepiped of the bounding box indicates the main axis V1 in correspondence to normal vectors V1, V2, and V3 of the surfaces that form the bounding box.

(Reference Non-Patent Literature 1: Eric Lengyel, "Mathematics for 3D Game Programming and Computer Graphics", COURSE TECHNOLOGY, 2012)

Figure 5:
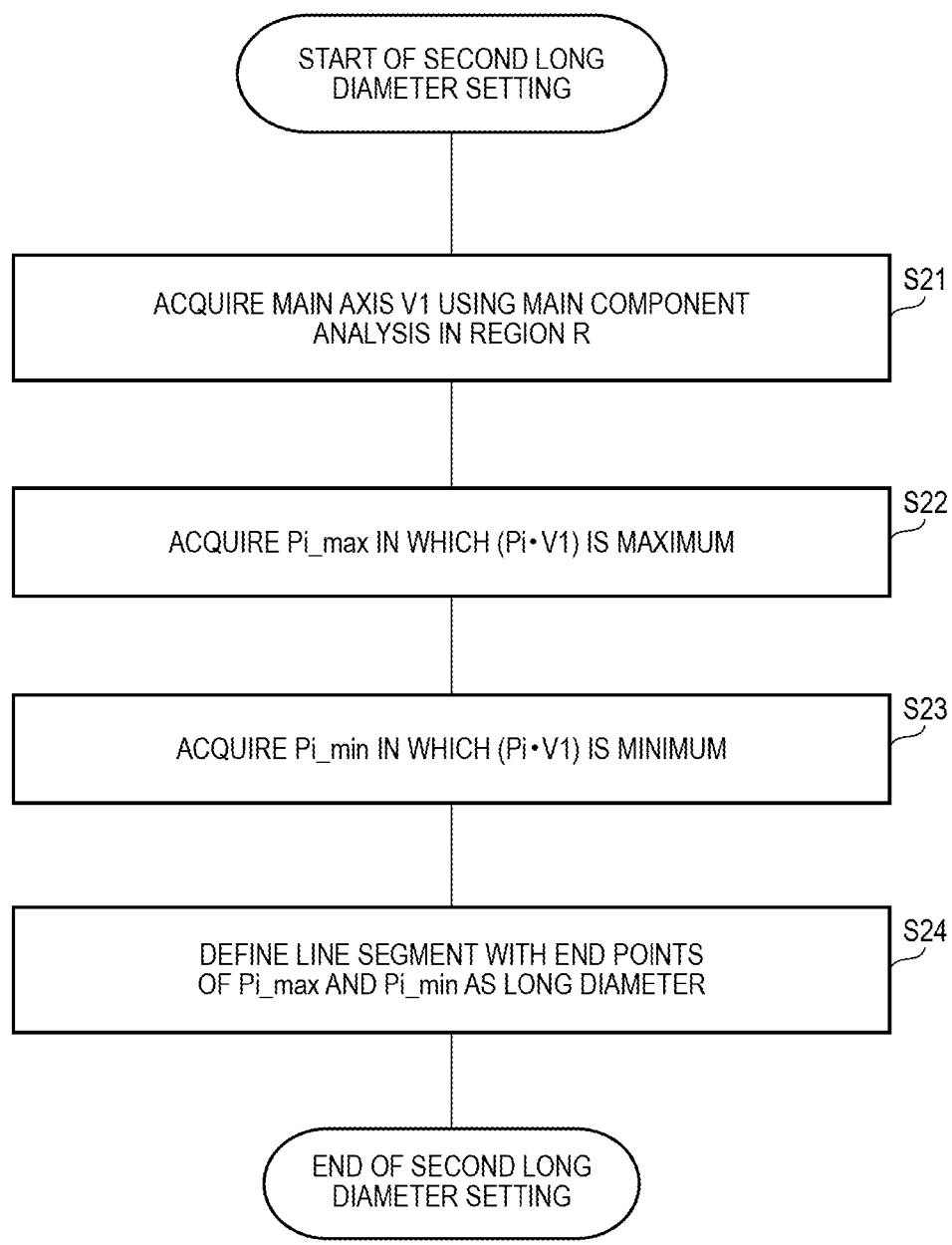
FIG. 5 is a flowchart illustrating a setting procedure for a long diameter in accordance with a second calculation method for the long diameter.

FIG. 5 is a flowchart illustrating a setting procedure for the long diameter Lk in accordance with the second calculation method for the long diameter Lk in S3 of FIG. 2.

The processor 140 acquires (for example, calculates) the main axis V1 through the above-described principal component analysis on the region R (S21).

The processor 140 acquires Pi_max in which (Pi·V1) is the maximum (S22).

Here, "·" represents inner product calculation.

The processor 140 acquires Pi_mix in which (Pi·V1) is the minimum (S23).

The processor 140 configures a line segment in which Pi_max and Pi_min are end points as the long diameter Lk (S24). The long diameter LK may not be parallel to the main axis indicated by the eigenvector V1. Thereafter, the processor 140 ends the present process and returns the process to the main process.

According to the second calculation method for the long diameter Lk, even when there is a region with a protrusion formed in a spike, a front end of a protrusion is prevented from being configured as an end point of the long diameter Lk as in the first calculation method. Therefore, the medical image processing apparatus 100 can calculate the appropriate long diameter Lk.

Next, calculation methods for a short diameter will be described.

First Calculation Method for Short Diameter

Figure 6:
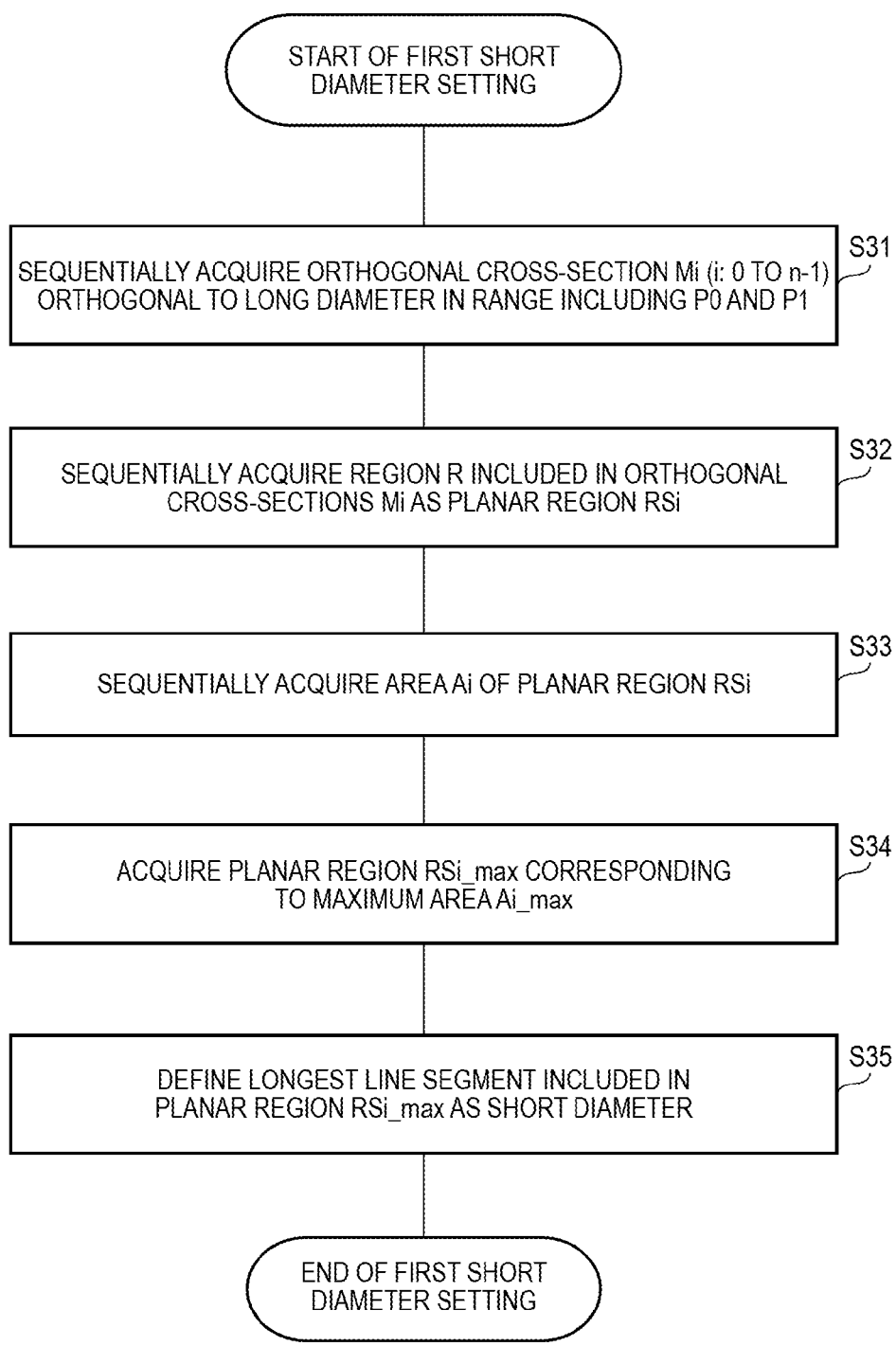
FIG. 6 is a flowchart illustrating a setting procedure for a short diameter in accordance with a first calculation method for the short diameter.
Figure 7:
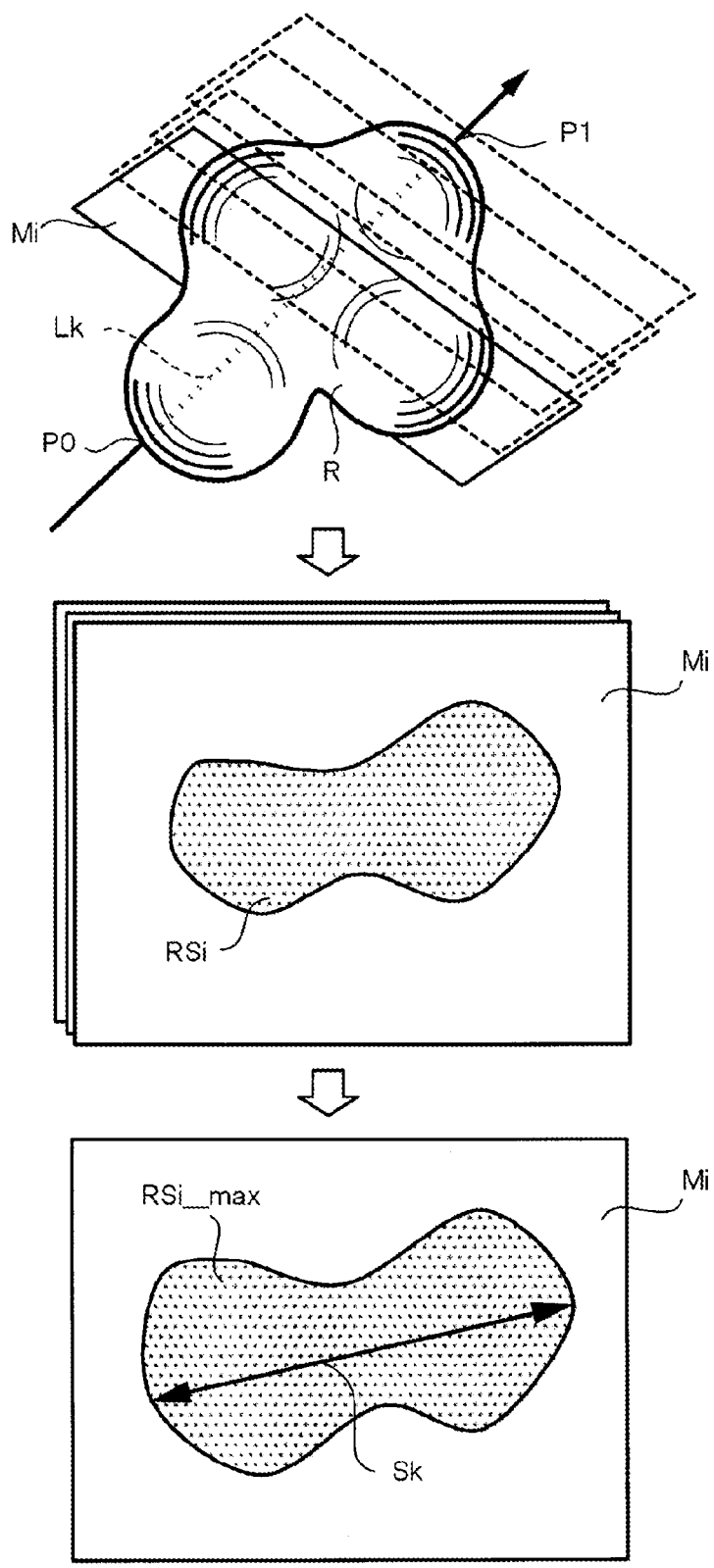
FIG. 7 is a schematic diagram illustrating the first calculation method for a short diameter.

FIG. 6 is a flowchart illustrating a setting procedure for the short diameter Sk in accordance with a first calculation method for the short diameter Sk in S4 of FIG. 2. FIG. 7 is a schematic diagram illustrating the first calculation method for the short diameter Sk.

The processor 140 sequentially acquire orthogonal cross-sections Mi (i: 0 to n−1) in a range including P0 to P1 in the orthogonal cross-sections to the long diameter Lk (the cross-sections orthogonal to the long diameter Lk) (S31). In FIG. 7, the long diameter Lk is a line segment in which P0 and p1 are end points. P0 and P1 are equivalent to Si1 and Si2 in the first calculation method for the long diameter Lk and are equivalent to Pi_max and Pi_min in the second calculation method for the long diameter Lk.

The processor 140 sequentially acquires planar regions RSi which is the region R included in the orthogonal cross-section Mi (S32).

The processor 140 sequentially acquires areas Ai of the planar regions RSi (S33).

The processor 140 acquires a planar region RSi_max corresponding to a largest area Ai_max among the sequentially acquired areas Ai (S34).

The processor 140 configures a longest line segment included in the planar region RSi_max as the short diameter Sk (S35). The short diameter Sk may be set to pass through the center of the planar region RSi_max. Thereafter, the processor 140 ends the present process and returns the process to the main process.

According to the first calculation method for the short diameter Sk, the short diameter Sk is included in the orthogonal cross-section to the long diameter Lk. Therefore, the user easily views the short diameter Sk. In particular, when orthogonal cross-sectional images with the long diameter Lk are sequentially transmitted along the long diameter Lk and displayed so that the user can observe the tissue or the like, the short diameter Sk is included in the orthogonal cross-sectional images. Accordingly, when the user observes the cross-sections including the short diameter Sk, it is easy for the user to intuitively know meaning of the orthogonal cross-sectional images.

Second Calculation Method for Short Diameter

Figure 8:
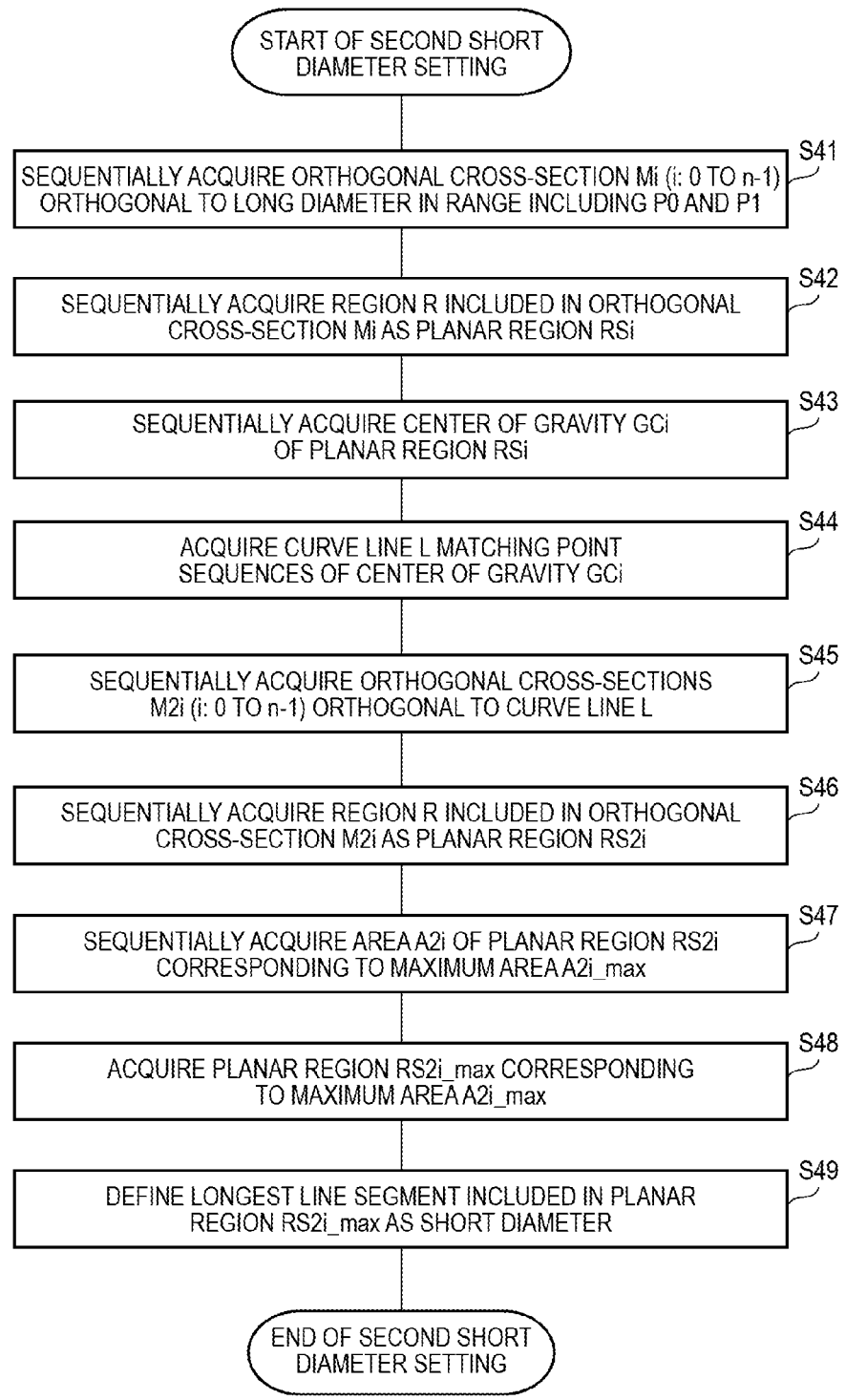
FIG. 8 is a flowchart illustrating a setting procedure for a short diameter in accordance with a second calculation method for the short diameter.
Figure 9:
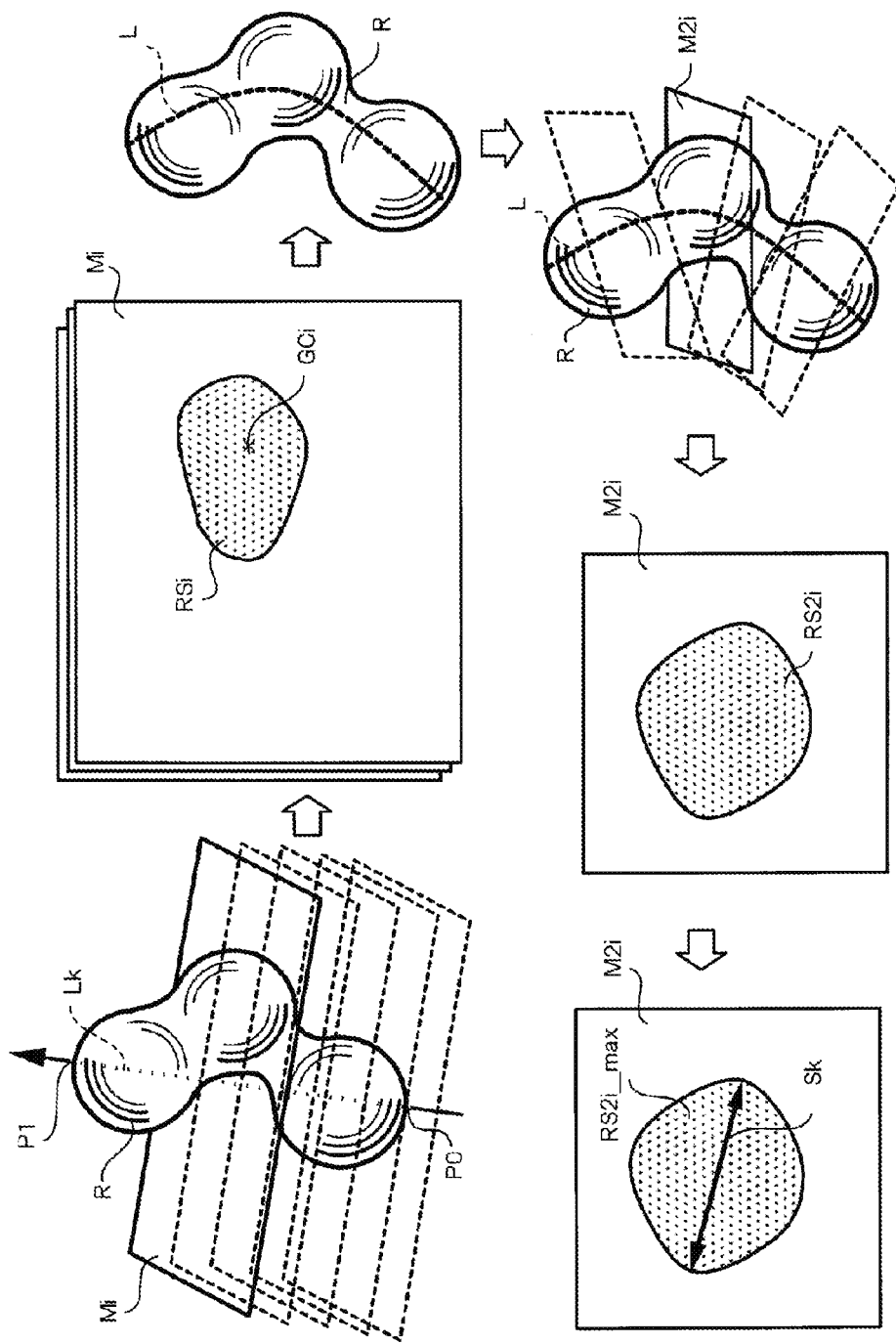
FIG. 9 is a schematic diagram illustrating the second calculation method for a short diameter.

FIG. 8 is a flowchart illustrating a setting procedure for the short diameter Sk in accordance with a second calculation method for the short diameter Sk in S4 of FIG. 2. FIG. 9 is a schematic diagram illustrating the second calculation method for the short diameter Sk.

The processor 140 sequentially acquires orthogonal cross-sections Mi (i: 0 to n−1) in a range including P0 to P1 on the orthogonal cross section to the long diameter Lk as in the first calculation method for the short diameter Sk (S41).

The processor 140 sequentially acquires planar regions RSi which are regions R included in the orthogonal cross sections Mi (S42).

The processor 140 sequentially acquires centers of gravity GCi of the planar regions RSi (S43).

The processor 140 acquires a curve line L matching a sequence of points of the centers of gravity GCi (S44). For example, when the tissue or the like is a rib bone, the curve line L approximately indicates a center line of the rib bone. Then, the processor 140 may acquire the curve line L by approximating the sequence of the points of the centers of gravity GCi to a spline curve. The approximation becomes smoother.

The processor 140 sequentially acquires orthogonal cross sections M2i (i: 0 to n−1) in the orthogonal cross sections to the curve line L (cross sections orthogonal to the curve line L at intersections) (S45).

The processor 140 sequentially acquires planar regions RS2i (i: 0 to n−1) which are regions R included in the orthogonal cross sections M2i (S46).

The processor 140 sequentially acquires areas A2i (i: 0 to n−1) of the planar regions RS2i (S47).

The processor 140 acquires a planar region RS2i_max corresponding to the largest area A2i_max among the sequentially acquired areas A2i (S48).

The processor 140 configures the longest line segment included in the planar region RS2i_max as the short diameter Sk (S49). The short diameter Sk may be set to pass through the center of the planar region RS2i_max. Thereafter, the processor 140 ends the present process and returns the process to the main process.

In the second calculation method for the short diameter Sk, the short diameter Sk may not be included in the orthogonal cross-section to the long diameter Lk. Accordingly, the medical image processing apparatus 100 can calculate the short diameter Sk forming to distortion or curvature even in a distorted or curved tissue or the like such as a rib bone or a kidney. In this case, when orthogonal cross-sectional images with the curve line L are sequentially transmitted along the curve line L and displayed so that the user can observe the tissue or the like, the short diameter Sk is included in the orthogonal cross-sectional images. Then, when the user observes the cross-sections including the short diameter Sk, it is easy for the user to intuitively know meaning of the orthogonal cross-sectional images.

In this way, the medical image processing apparatus 100 calculates the long diameter Lk of the tissue or the like and subsequently calculates the short diameter Sk of the orthogonal cross-section to the long diameter Lk or the orthogonal cross-section to the curve line L. A tissue or the like rarely has a regular shape. In this case, in the medical image processing apparatus 100, basically, the long diameter Lk is not orthogonal to the short diameter Sk and the long diameter Lk and the short diameter Sk is a pair of skew lines.

The shape of the tissue or the like is actually an irregular shape in which the long diameter Lk and the short diameter Sk do not intersect each other in many cases. When there is a hole in a tissue or the like, it is difficult to ascertain the accurate shape of the tissue or the like. For example, when the inside of a tissue or the like dies, the inside of the tissue or the like becomes hollow. When a different unrelated tissue is contained in a tissue or the like, it is difficult to ascertain an accurate shape of the tissue or the like. For example, since there are many blood vessel regions in a kidney, it is difficult to ascertain an accurate shape of a kidney single.

For the long diameter Lk and the short diameter Sk is a pair of skew lines, the medical image processing apparatus 100 can calculate the long diameter Lk and the short diameter Sk even in a tissue or the like that has a peculiar shape (for example, a distorted or curved shape) which is difficult to present in elliptic approximation. Thus, the medical image processing apparatus 100 can easily present the shape or size of a subject which is a tissue or the like as an image, and thus the user easily recognizes the actual shape of the subject (the tissue or the like).

Figure 10:
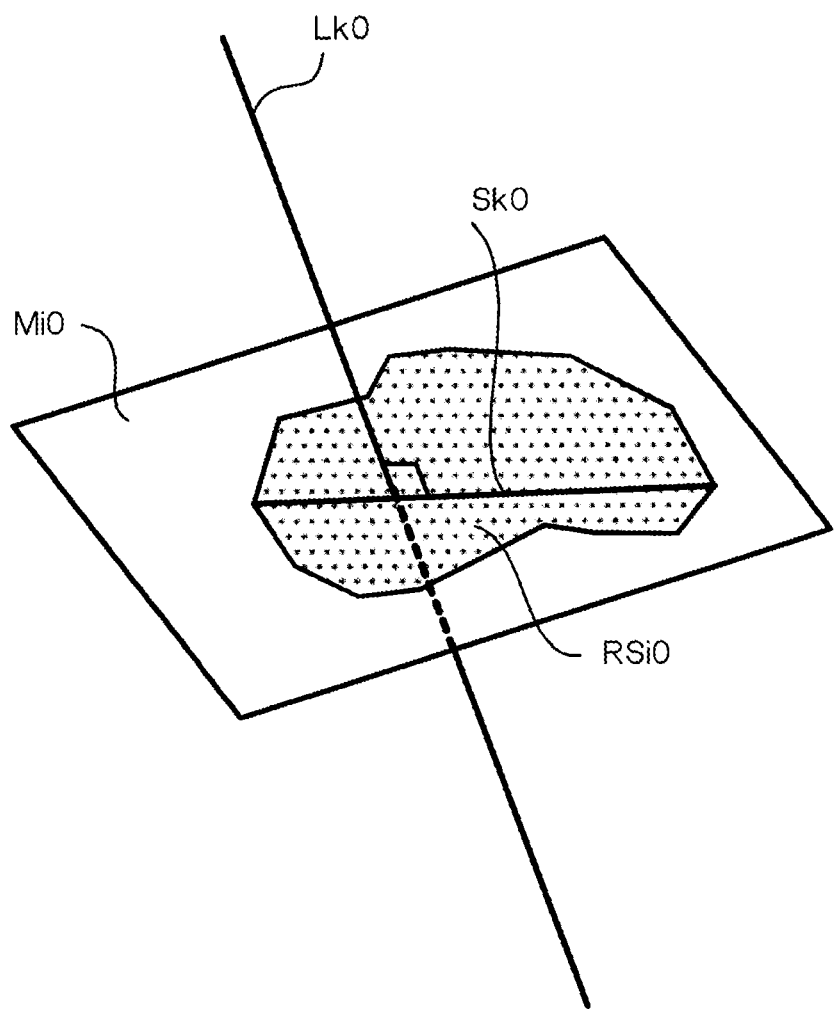
FIG. 10 is a schematic diagram when long and short diameters are orthogonal to each other according to a comparative example.

FIG. 10 is a schematic diagram when a long diameter Lk0 and a short diameter Sk0 are orthogonal to each other according to a comparative example. In this case, the long diameter Lk0 and the short diameter Sk0 intersect in a planar region RSi0. When a short diameter intersects a long diameter at a non-right angle, the short diameter is not included in an orthogonal cross-section.

Figure 11:
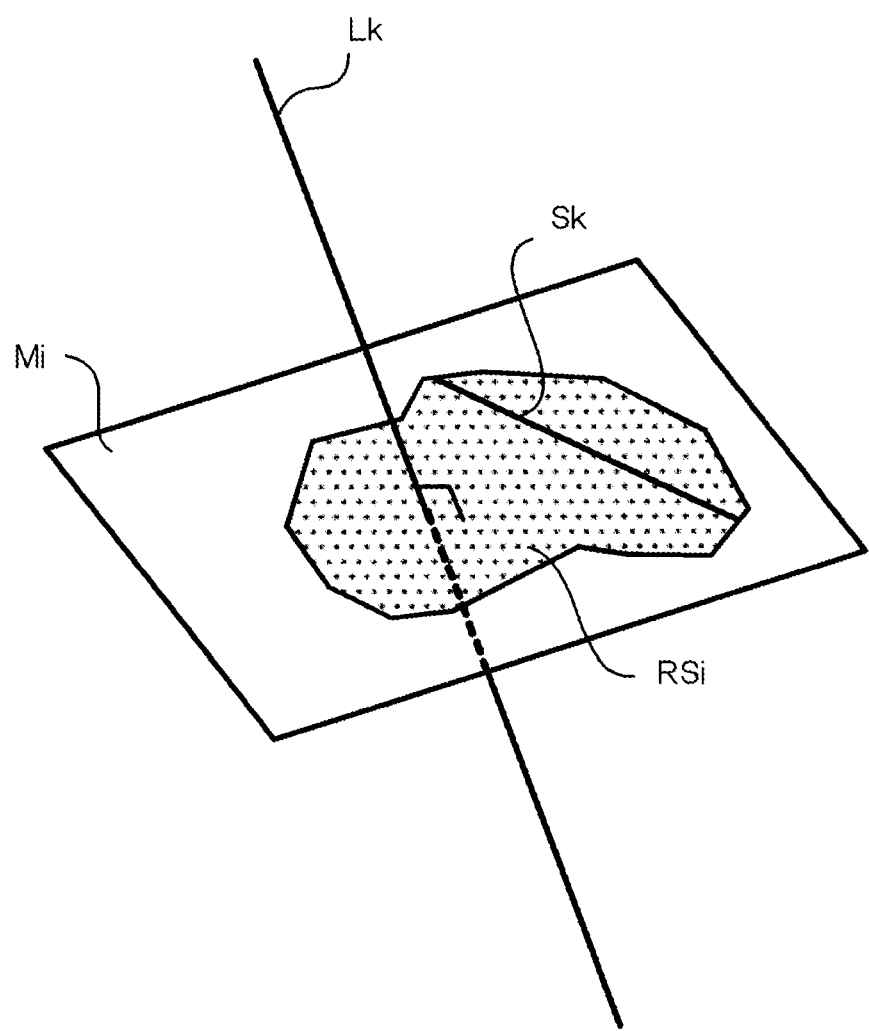
FIG. 11 is a schematic diagram when a short diameter and a long diameter is a pair of skew lines, and also the short diameter is positioned coplanar of an orthogonal cross-section to the long diameter.

FIG. 11 is a schematic diagram when the short diameter Sk and the long diameter Lk is a pair of skew lines, and also the short diameter Sk is positioned coplanar of an orthogonal cross-section Mi to the long diameter Lk. In this case, when MPR cross-sections are displayed in order as orthogonal cross-sections Mi to the long diameter Lk, the short diameter Sk in one MPR cross-section is necessarily included in a planar region RSi. Therefore, the user easily ascertains the short diameter Sk. The short diameter Sk in FIG. 11 can be calculated in accordance with the first calculation method for the short diameter Sk.

Figure 12:
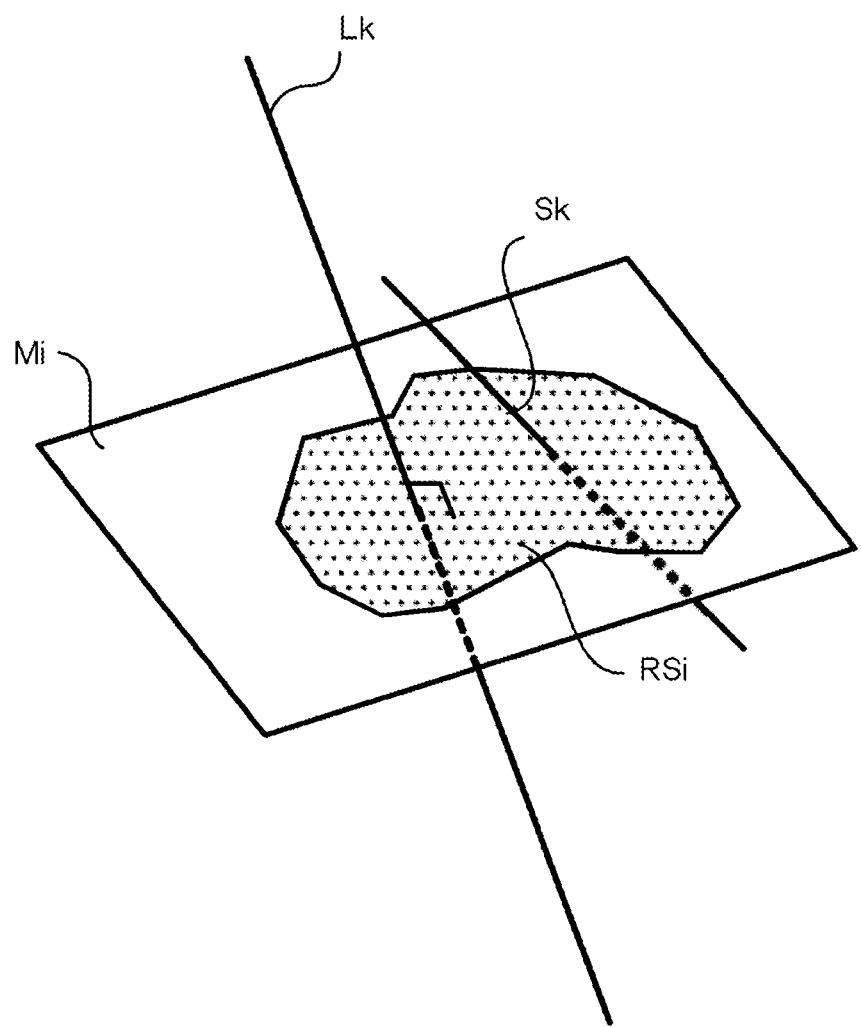
FIG. 12 is a schematic diagram when a short diameter and a long diameter is a pair of skew lines, and also the short diameter is positioned non coplanar of an orthogonal cross-section to the long diameter.

FIG. 12 is a schematic diagram when the short diameter Sk and the long diameter Lk is a pair of skew lines, and also the short diameter Sk is positioned non coplanar of an orthogonal cross-section Mi to the long diameter Lk. The short diameter Sk interests an orthogonal cross-section Mi to the long diameter Lk. In this case, the short diameter Sk intersects a planar region RSi, the short diameter Sk forming to the shape of a tissue or the like can be set. The short diameter Sk in FIG. 12 can be calculated in accordance with the second calculation method for the short diameter Sk.

In the medical image processing apparatus 100 according to the embodiment, the port 110 acquires volume data including a subject from the CT apparatus 200. The processor 140 calculates the long diameter Lk and the short diameter Sk of the subject. The display 130 displays the long diameter Lk and the short diameter Sk. A line segment presenting the long diameter Lk and a line segment presenting the short diameter Sk is a pair of skew lines.

Thus, the medical image processing apparatus 100 can calculate the long diameter Lk and the short diameter Sk of the region R which is a tissue or the like with high precision. That is, an error of the shape of a subject such as a tissue or the like is less than in other approximation method such as elliptic approximation, and thus the long diameter Lk and the short diameter Sk are close to an actual entity. Accordingly, the medical image processing apparatus 100 can also appropriately calculate the long diameter Lk and the short diameter Sk of a massive irregular tissue or the like. Accordingly, the user can easily recognize the actual shape of a subject by confirming the long diameter Lk and the short diameter Sk of the subject.

The medical image processing apparatus 100 can prevent a situation in which a diagnostic result by a medical doctor is changed depending on a 2-dimensional projected surface of a three-dimensional image by improving calculation precision of the long diameter Lk and the short diameter Sk.

The medical image processing apparatus 100 can also improve the calculation precision of the volume of the subject calculated based on the long diameter Lk and the short diameter Sk by improving the calculation precision of the long diameter Lk and the short diameter Sk. Accordingly, the medical image processing apparatus 100 can improve the calculation precision of the volume by also obtaining the volume through rotational elliptic approximation.

The medical image processing apparatus 100 can uniquely obtain the long diameter Lk and the short diameter Sk in a given stereoscopic shape. Therefore, reproduction of numerical values is ensured and thus objectivity is guaranteed.

An end point of the line segment presenting the long diameter Lk and an end point of the line segment presenting the short diameter Sk may be included in a 3-dimensional region of a subject.

Thus, the long diameter Lk and the short diameter Sk of a subject falls in the region R. When the long diameter Lk and the short diameter Sk are displayed, the user can easily view and understand the long diameter Lk and the short diameter Sk.

A cross-section orthogonal to the long diameter Lk of a subject may be included in the short diameter Sk.

Thus, the short diameter Sk is included in an MPR cross-section as an orthogonal cross-section Mi to the long diameter Lk. That is, since the short diameter Sk is present in the orthogonal cross-section, the user easily views the short diameter Sk and imaging is easy.

The short diameter Sk may intersect the cross-section orthogonal to the long diameter Lk of a subject.

Thus, the medical image processing apparatus 100 can set the short diameter Sk further conforming to the shape of a tissue or the like. For example, the medical image processing apparatus 100 can calculation the short diameter Sk conforming to a present situation in an organ or the like that has a distorted or curved shape.

The embodiment has been described above with reference to the drawings, but it is regardless to say that the present disclosure is not limited to the example. It should be apparent to those skilled in the art that various modification examples or correction examples can be made within the scope described in the claims and it is understood that the modification examples and the correction examples also, of course, pertain to the technical scope of the present disclosure.

In the foregoing embodiment, the case in which the long diameter Lk and the short diameter Sk of the tissue or the like is a pair of skew lines has been assumed, but the long diameter Lk and the short diameter Sk may be coplanar. Even in this case, the medical image processing apparatus 100 calculates the long diameter Lk and the short diameter Sk with high precision.

In the foregoing embodiment, the calculation of two diameters of the long diameter Lk and the short diameter Sk has been exemplified, but three or more diameters in a subject may be calculated. Thus, the medical image processing apparatus 100 can recognize the shape of the subject more easily.

In the foregoing embodiment, the calculation of the short diameter Sk has been exemplified using the long diameter Lk. However, the short diameter Sk may be calculated using any reference line without using the long diameter Lk. In this case, the reference line may be a line other than the curve line L. The short diameter Sk may be calculated based on eigenvectors V2 and V3.

In the foregoing embodiment, the short diameter Sk may be a longest line segment passing through the center of a cross-section in a cross-section with a largest area, but a shortest line segment passing through the center of a cross-section may be used. This is because the method is more convenient in some case when the flat degree of a tissue is confirmed.

In the foregoing embodiment, the processor 140 obtains a surface including the short diameter Sk in the orthogonal cross-section to the long diameter Lk, but a surface including the short diameter Sk in an orthogonal cross-section to a part of the long diameter Lk may be obtained (for example, calculated). For example, the processor 140 may obtain a surface including the short diameter Sk in an orthogonal cross-section to a line segment of ½ of the middle of the long diameter Lk except for ¼ of each of both ends. Thus, the medical image processing apparatus 100 can prevent a short diameter from being formed in a corner of a tissue or the like intuitively considered not to be suitable for the short diameter Sk.

In the foregoing embodiment, the processor 140 obtains the surface including the short diameter Sk in the orthogonal cross-section to the curve line L, but may obtain a surface including the short diameter Sk in an orthogonal cross-section to a part of the curve line L.

In the foregoing embodiment, the processor 140 obtains the short diameter Sk from the cross-section with the largest area. However, the short diameter Sk may be obtained in a surface with the smallest area. In this case, the processor 140 may obtain a surface including the short diameter Sk in an orthogonal cross-section to a part of the long diameter Lk.

In the foregoing embodiment, the long diameter Lk and the short diameter Sk are included in the region R. However, the long diameter Lk and the short diameter Sk may not be included in the region R. For example, a straight line LL orienting toward the vector V1 passing through the center of gravity m may be considered and a range included in the bounding box in the straight line LL may be configured as the long diameter Lk.

In the foregoing embodiment, the processor 140 sets the region R of a tissue or the like included in the volume data by extracting a region of interest. However, principal component analysis may be performed on a tissue or the like in regard to a high-luminance voxel included in the volume data to obtain the long diameter Lk and the short diameter Sk.

In the foregoing embodiment, the processor 140 configures the longest line segment included in the region R as the long diameter Lk. However, in the boundary of the region R, a half-value width may be measured for a straight line including a line segment, the long diameter Lk may be adjusted, an a line segment deviating from the region R may be configured as the long diameter Lk. This can also be regarded as adjustment of the region R. For the short diameter Sk, a half-value width may be used for the adjustment.

In the foregoing embodiment, the processor 140 performs the principal component analysis on the coordinates of a voxel included in the region R. However, the coordinates of the voxel may be weighted using a voxel value and the principal component analysis may be performed. Then, the processor 140 may obtain the long diameter Lk and the short diameter Sk using the weighted result of the principal component analysis.

In the foregoing embodiment, it is not clearly specified whether the region R is a hollow region, but the region R may be a hollow region. When the region R is a hollow region, the hollow region may be filled and a solid region may be configured as the region R.

In the foregoing embodiment, it is not clearly specified that the region R is a region with a through hole, but the region may be the region R with a through hole. When the region R is a region with a through hole, the hole may be filled and a solid region may be configured as the region R. When the region R is a region with a non-through hole, the filled region may be configured as the region R.

In the foregoing embodiment, the long diameter Lk and the short diameter Sk are included in the region R, but the end points of the long diameter Lk and the short diameter Sk may be included in the region R and parts of the long diameter Lk and the short diameter Sk may be deviated from the region R. This is effective in a distorted tissue such as a rib bone or a tissue or the like such as a tumor in which a middle portion is absent.

In the foregoing embodiment, the processor 140 may extract the region R from the volume data and perform various processes, or may perform various processes without extracting the region R from the volume data.

In the foregoing embodiment, in regard to the processor 140, there is a case in which the region R extracted from the volume data is discontinuous, that is, the volume data includes a plurality of tissues, or a case in which one tissue or the like is divided into a plurality of portions. At this time, one tissue or the like may be selected from the plurality of tissues or the like and the region R may be a continuous region. One region R may be selected from the plurality of regions R that form a tissue or the like and the regions R may be configured as a continuous region.

Accordingly, a subject may be formed in a spatially continuous region. Thus, since regions of a subject are not away from each other as in detached spots, the user easily observes an observation target subject.

In the foregoing embodiment, in regard to the processor 140, there is a case in which the region R extracted from the volume data is discontinuous, that is, the volume data includes a plurality of tissues, or a case in which one tissue or the like is divided into a plurality of portions. For example, the region R extracted from the volume data is configured to include a relatively large blob of a central portion and small regions scattering in the circumference in some cases. At this time, the region R may be configured to include a relatively large blob of a central portion and small regions scattering in the circumference.

Accordingly, a subject may be formed in a spatially discontinuous region. Thus, regions of the subject are distant from each other as in detached spots, and thus the user easily observes an observation target subject overall.

In the foregoing embodiment, the volume data is transmitted as an acquired CT image from the CT apparatus 200 to the medical image processing apparatus 100, as exemplified above. Instead, the volume data may be transmitted to a server on a network to be stored in the server or the like so that the volume data can be temporarily stored. In this case, the port 110 of the medical image processing apparatus 100 may acquire the volume data from the server or the like via a wired circuit or a wireless circuit as necessary or may acquire the volume data via any storage medium (not illustrated).

In the foregoing embodiment, the volume data is transmitted as an acquired CT image from the CT apparatus 200 to the medical image processing apparatus 100 via the port 110, as exemplified above. In practice, the CT apparatus 200 and the medical image processing apparatus 100 are also formed together as one product in some cases. The medical image processing apparatus 100 can also be treated as a console of the CT apparatus 200.

In the foregoing embodiment, an image is acquired by the CT apparatus 200 and the volume data including information regarding the inside of an organism is generated, as exemplified above. However, an image may be acquired by other apparatuses to generate volume data. The other apparatuses include a magnetic resonance imaging (MRI) apparatus, a position emission tomography (PET) apparatus, an angiography apparatus, and other modality apparatuses. The PET apparatus may be combined with another modality apparatus to be used.

In the foregoing embodiment, a human body has been exemplified as an organism. However, an animal's body may be used.

The present disclosure can also be presented as a medical image processing method of defining an operation of the medical image processing apparatus. Further, as an application range of the present disclosure, a program realizing functions of the medical image processing apparatus according to the foregoing embodiment is provided to the medical image processing apparatus via a network or any of various storage media and a computer in the medical image processing apparatus reads and executes the program.

The present disclosure is useful for a medical image processing apparatus, a medical image processing method, and a medical image processing program in which a user easily recognizes an actual shape of a tissue or the like.

What is claimed is:

1. A medical image processing apparatus comprising:
a port that acquires volume data defined by at least two orthogonal axes and including a subject, wherein the volume data is from imaging of a medical patient, and the subject is a three-dimensional anatomical object having an irregular shape;
a processor that calculates long and short diameters of the subject, the long and short diameters being skew lines; and
a display that displays an image of the medical patient and a three-dimensional image of the subject superimposed with the long and short diameters, wherein the image of the medical patient and the three-dimensional image of the subject are generated from the volume data.

2. The medical image processing apparatus according to claim 1, wherein an end point of the long diameter and an end point of the short diameter are included in a three-dimensional region of the subject.

3. The medical image processing apparatus according to claim 1, wherein the short diameter is coplanar of a cross-section orthogonal to the long diameter.

4. The medical image processing apparatus according to claim 1, wherein a cross-section orthogonal to the long diameter intersects the short diameter.

5. The medical image processing apparatus according to claim 1, wherein the subject is formed in a three-dimensionally continuous region.

6. The medical image processing apparatus according to claim 1, wherein the processor calculates the long diameter by:
determining a line segment having the longest distance between two voxels of the volume that form a surface region of the subject, or by:
calculating a product of each voxel coordinate that contains the subject and a vector representing a main axis of the subject, and
determining the long diameter as a line segment connecting the coordinates having the minimum and maximum product.

7. The medical image processing apparatus according to claim 1, wherein the processor calculates the short diameter by:
acquiring cross-sections of the volume orthogonal to the long diameter, each cross-section corresponding to a planar region of the subject, and
determining the short diameter as a line segment having the longest distance in a planar region having the greatest area, or by:
acquiring cross-sections of the volume orthogonal to the long diameter, each cross-section corresponding to a planar region of the subject,
determining a center of gravity in each planar region,
determining a curve line through each center of gravity,
acquiring second cross-sections of the volume orthogonal to the curve line, each cross-section corresponding to a second planar region of the subject, and
determining the short diameter as a line segment having the longest distance in a second planar region having the greatest area.

8. The medical image processing apparatus according to claim 1, wherein the long diameter is not parallel to a main axis of the subject.

9. The medical image processing apparatus according to claim 1, wherein end points of the long diameter are located on an edge of the subject.

10. A medical image processing method in a medical image processing apparatus, the method comprising:
acquiring volume data defined by at least two orthogonal axes and including a subject, wherein the volume data from imaging of a medical patient, and the subject is a three-dimensional anatomical object having an irregular shape;
calculating long and short diameters of the subject, the long and short diameters being skew lines; and
displaying an image of the medical patient and a three dimensional image of the subject superimposed with the long and short diameter on a display, wherein the image of the medical patient and the three-dimensional image of the subject are generated from the volume data.

11. The medical image processing method according to claim 10, wherein the long diameter is calculated by:
determining a line segment having the longest distance between two voxels of the volume that form a surface region of the subject, or by:
calculating a product of each voxel coordinate that contains the subject and a vector representing a main axis of the subject, and
determining the long diameter as a line segment connecting the coordinates having the minimum and maximum product.

12. The medical image processing method according to claim 10, wherein the short diameter is calculated by:
acquiring cross-sections of the volume orthogonal to the long diameter, each cross-section corresponding to a planar region of the subject, and
determining the short diameter as a line segment having the longest distance in a planar region having the greatest area, or by:
acquiring cross-sections of the volume orthogonal to the long diameter, each cross-section corresponding to a planar region of the subject,
determining a center of gravity in each planar region,
determining a curve line through each center of gravity,
acquiring second cross-sections of the volume orthogonal to the curve line, each cross-section corresponding to a second planar region of the subject, and
determining the short diameter as a line segment having the longest distance in a second planar region having the greatest area.

13. The medical image processing method according to claim 10, wherein the long diameter is not parallel to a man axis of the subject.

14. The medical image processing method according to claim 10, wherein end points of the long diameter are located on an edge of the subject.

15. A non-transitory computer-readable medium having instructions stored thereon that, when executed by a computer, cause the computer to:
acquire volume data defined by at least two orthogonal axes and including a subject, wherein the volume data is from image of medical patient, and the subject is a three-dimensional anatomical object having an irregular shape;
calculate long and short diameters of the subject, the long and short diameters being skew lines; and display an image of the medical patient and three-dimensional image of the subject superimposed with the long and short diameters on a display, wherein the image of the medical patient and the three-dimensional image of the subject are generated from the volume data.

16. The non-transitory computer-readable medium according to claim 15, wherein the long diameter is calculated by:
- determining a line segment having the longest distance between two voxels of the volume that form a surface region of the subject, or by:
- calculating a product of each voxel coordinate that contains the subject and a vector representing a main axis of the subject, and
- determining the long diameter as a line segment connecting the coordinates having the minimum and maximum product.

17. The non-transitory computer-readable medium according to claim 15, wherein the short diameter is calculated by:
- acquiring cross-sections of the volume orthogonal to the long diameter, each cross-section corresponding to a planar region of the subject, and
- determining the short diameter as a line segment having the longest distance in a planar region having the greatest area, or by:
- acquiring cross-sections of the volume orthogonal to the long diameter, each cross-section corresponding to a planar region of the subject,
- determining a center of gravity in each planar region,
- determining a curve line through each center of gravity,
- acquiring second cross-sections of the volume orthogonal to the curve line, each cross-section corresponding to a second planar region of the subject, and
- determining the short diameter as a line segment having the longest distance in a second planar region having the greatest area.

18. The non-transitory computer-readable medium according to claim 15, wherein the long diameter is not parallel to a main axis of the subject.

19. The non-transitory computer-readable medium according to claim 15, wherein end points of the long diameter are located on an edge of the subject.

* * * * *